(12) United States Patent
Tomerlin et al.

(10) Patent No.: US 8,056,862 B1
(45) Date of Patent: Nov. 15, 2011

(54) THERMAL PROTECTION SYSTEMS FOR AIR AND SPACE VEHICLES HAVING HIDDEN FASTENER ATTACHMENTS

(75) Inventors: Reg Tomerlin, Los Angeles, CA (US); Allen W. Harwood, Fountain Valley, CA (US); Richard Hoff, Santa Ana, CA (US)

(73) Assignee: Arrowhead Products Corporation, Los Alamitos, CA (US)

( * ) Notice: Subject to any disclaimer, the term of this patent is extended or adjusted under 35 U.S.C. 154(b) by 0 days.

(21) Appl. No.: 12/802,601

(22) Filed: Jun. 9, 2010

(51) Int. Cl.
  *B64G 1/58* (2006.01)
(52) U.S. Cl. .................................................. 244/159.1
(58) Field of Classification Search .............. 244/159.1, 244/119; 52/404.1, 404.2, 406.1, 406.2; 403/326–328, 322.2
See application file for complete search history.

(56) References Cited

U.S. PATENT DOCUMENTS

| | | | | |
|---|---|---|---|---|
| 3,321,154 | A * | 5/1967 | Downs ........................ | 244/159.1 |
| 4,012,879 | A * | 3/1977 | Aubert et al. .................... | 52/508 |
| 4,804,571 | A * | 2/1989 | Jouffreau ......................... | 428/77 |
| 4,919,366 | A * | 4/1990 | Cormier ...................... | 244/159.1 |
| 5,207,544 | A * | 5/1993 | Yamamoto et al. ........... | 411/348 |
| 5,452,979 | A * | 9/1995 | Cosenza ....................... | 411/348 |
| 5,489,074 | A * | 2/1996 | Arnold et al. .............. | 244/159.1 |
| 6,299,106 | B1 * | 10/2001 | Shorey ....................... | 244/171.7 |

* cited by examiner

*Primary Examiner* — Tien Dinh
(74) *Attorney, Agent, or Firm* — Roy A. Ekstrand

(57) ABSTRACT

A thermal protection system for use upon an air or space vehicle includes a plurality of thermal protection panels formed of a suitable ceramic matrix composition or other thermally protective material each panel having a continuous outer surface free of penetrations or apertures. A plurality of cooperating fasteners are secured between the outer surface of a host vehicle and the undersurface of the thermal protection panels. The fasteners utilize a latching mechanism to secure the panels to the surface of the host air or space vehicle without requiring penetrations or irregularities in the panel surfaces.

16 Claims, 5 Drawing Sheets

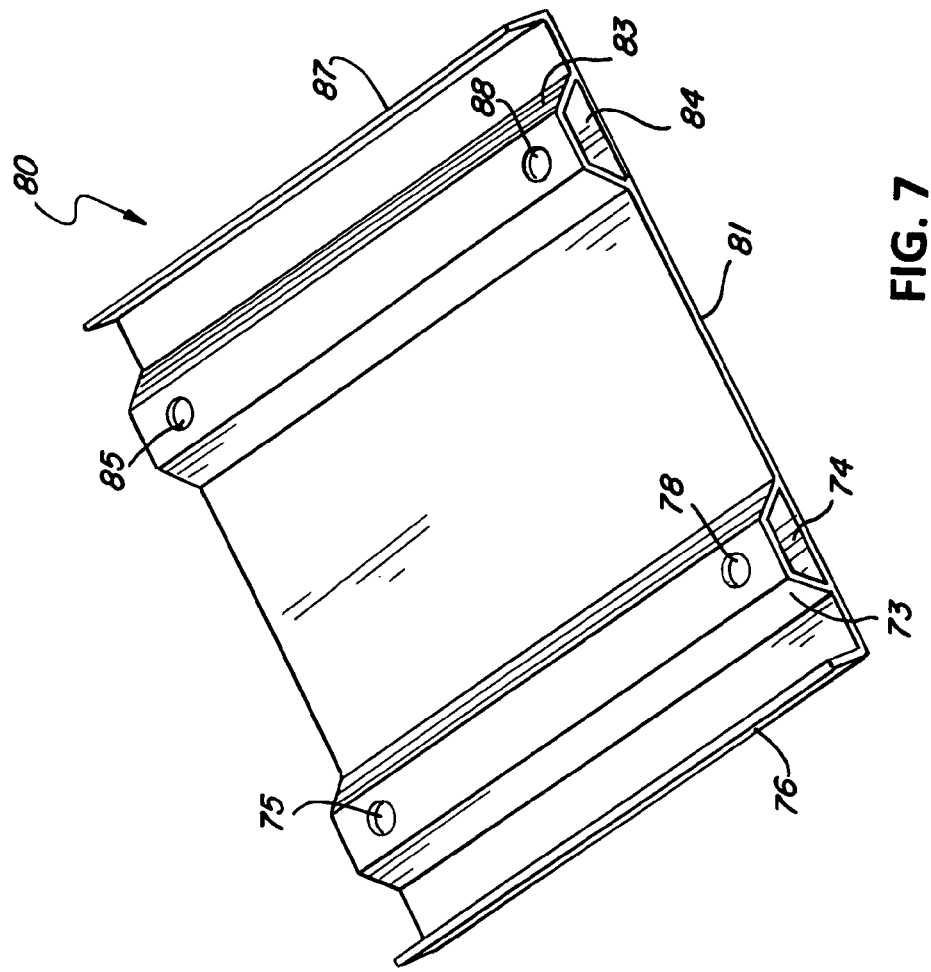
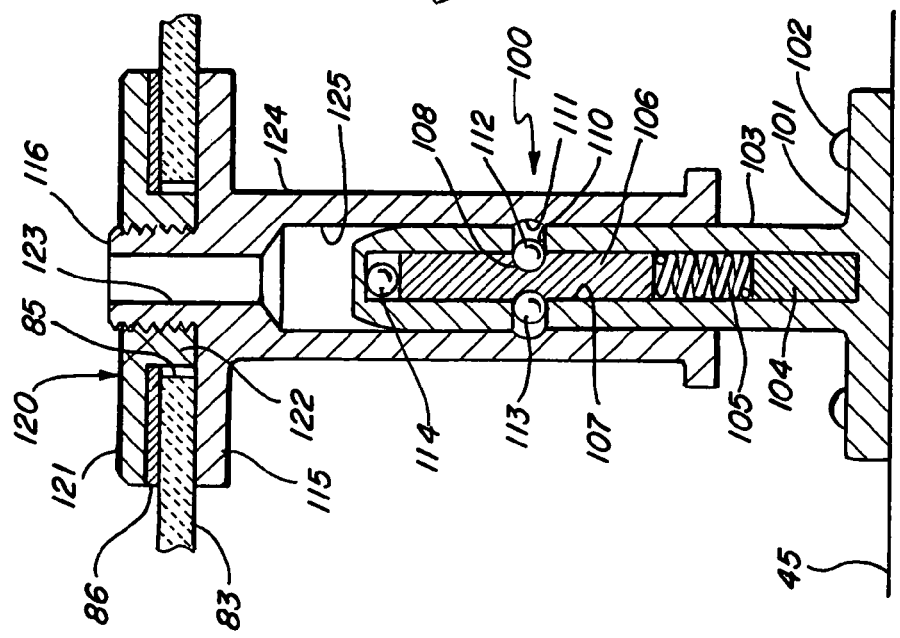
FIG. 7
FIG. 6

THERMAL PROTECTION SYSTEMS FOR AIR AND SPACE VEHICLES HAVING HIDDEN FASTENER ATTACHMENTS

FIELD OF THE INVENTION

This invention relates generally to thermal protection systems of the type utilized by air and space vehicles operating in environments which expose the vehicle to high temperatures and particularly to attachment mechanisms utilized in securing thermal protective insulating panels or tiles to the skin or structure of air and space vehicles.

BACKGROUND OF THE INVENTION

Air and space vehicles are often required to operate within earth's atmosphere at extreme speeds with the result that air friction upon the surfaces of such high speed vehicles produces sufficient heat to raise certain portions of the air and space vehicles to temperatures which exceed the operating limits of most, if not all, metal vehicle structures. Exposure to such elevated temperatures subjects the vehicle to potential structural failure often with disastrous results.

To protect critical surfaces and edges of air and space vehicles during such extreme temperature operation, practitioners in the art provide thermally protective cover structures upon such surfaces and edges which comprise heat resistant thermally insulative protective tiles or panels. In most instances, protective tiles are attached to the host air or space vehicle using adhesive attachment or mechanical fasteners and standoff.

Adhesive attachment systems have been used extensively for vehicles such as the NASA space shuttle vehicles and other early developed systems. Adhesive attachment has been plagued by recurring problems of reliability and excessive cost which has prompted practitioners in the art to focus primarily upon mechanical fastener and standoff supporting mechanisms within thermal protection systems.

In the most typical of the newly developing thermally protection systems, metal fastener standoffs are mechanically secured to the thermal protective tiles or panels and to the underlying or space vehicle structure. The objective is to provide a plurality of thermally protective tiles or panels which form a covering layer over the vulnerable air or space vehicle surfaces. In an attempt to maintain a smooth substantially continuous thermal protective outer "skin" for the host craft, the attachment of the fastener to the thermally protective tile or panel is usually recessed relative to the outer surface of the thermally protective tile or panel. The recess is then covered with an adhesively secured covering plug typically formed of the same thermally protective material as the tiles or panels.

While mechanical fasteners and standoffs appear to offer the promise of more cost effective alternative to adhesive attachment of thermally protective tiles and panels, the integrity resulting thermal protection system is to some extent dependent upon the adhesively attached covering plugs. In the event any covering plug becomes dislodged or displaced, the underlying metal fastener is exposed to extreme heat during high temperature operation. Under these conditions, an exposed metal fastener becomes a "thermal short" conducting heat directly to the vulnerable overlying surface of the air or space vehicle to which the fastener or standoff is secured. The extreme heat conducted by the fastener to the supporting structure of the air or space vehicle compromises the structural integrity of the vehicle and exposes the entire vehicle to dangerous structural failure.

The use of adhesively secured covering plugs within the developing fastener and standoff type thermal protection systems is both costly and undesirable in that it continues to raise concerns as to the overall system reliability and safety of such thermal protective systems.

Faced with the critical need to provide safer, more reliable thermal protection systems for air and space vehicles and the concurrent need for simultaneously reducing costs of fabrication and maintenance of such thermal protection systems, practitioners in the art have provided a variety of thermal protection apparatus. For example, U.S. Pat. No. 7,377,469 issued to Cherian provides for absorbing the differences between the dimensions of tiles and the dimensions of a spacecraft's body, while still holding the tile, during temperature changes during the operation of the spacecraft. The tile are attached to the body using Tie Rods (TRs) or Flex Joints or fasteners. The tie rods flex in the expected direction(s) of the deformation. The tie rod can be shaped to flex in one or more of the directions of the expected deformation.

U.S. Pat. No. 6,293,496 issued to Moe sets forth strain compatible attachment arrangements for securing a plurality of metallic thermal protection (TPS) panels to the substructure of a space vehicle, such as a reusable launch vehicle. The metallic TPS panels are attached in an edge abutting relationship to provide a coterminous outer TPS panel surface that is spaced from the substructure portion of the vehicle and which provides the outside mold line surface of the space vehicle. The attachment arrangement provides a separate stand-off means that is attached at one end to the vehicle substructure and at the other end to one corner of a TPS panel. Each TPS panel when viewed in a plan view will have three or four corners and may assume a number of shapes such as triangular, square, trapezoidal, etc. and may be curved. Each corner of each TPS panel is provided with an apertured insert provided with a plurality of circumferentially arranged locking projections.

U.S. Pat. No. 5,575,439 issued to Heinze et al. sets forth a positive-locking fastening for a thermal protection structure consisting of a plurality of highly heat-resistant, stable panels and a fastener system for fastening a thermal protection structure on an airframe of a spaceplane, particularly a spacecraft intended to reenter the atmosphere. The thermal protection structure is composed of a plurality of highly heat-resistant mechanically stable panels, having a hot gas-exposed panel surface and an airframe surface. The panels may be provided with an additional gap seal, if desired. A plurality of fastening points are provided per panel. These fastening points are arranged at spaced locations from one another and establish a position-locking connection between the thermal protection structure and the airframe. The fastening includes a first fastening point (fixed bearing) which permits no movement or permits only a limited rotary movement of the panel around an axis that is at right angles or nearly at right angles to the airframe surface or to a local tangential plane of the airframe surface. A second fastening point is provided which permits a limited linear (diametric) displacement of the panel, in a direction parallel or substantially in parallel to the airframe surface. At least another fastening point is provided which permits a limited displacement of the panel in all directions which are parallel to or substantially parallel to the airframe surface.

U.S. Pat. No. 5,489,074 issued to Arnold et al. sets forth a thermal protection device, in particular for an aircraft or a space vehicle, comprising a plurality of juxtaposed unit modules each comprising a fairing element provided with fixing tabs, thermal insulation integrated in the fairing elements, and rigid connection means for releasably connecting the fixing tabs to a primary structure that is to be protected. The gap between neighboring fairing elements is limited to a value substantially equal to the minimum value necessary for accommodating thermal expansion of the fairing elements, and the rigid connection means for connecting a fixing tab of a module to the primary structure comprise a ball fixed to the fixing tab in adjustable manner and capable of being locked inside a corresponding socket of a retaining part fixed to the primary structure, the ball being locked in its socket by means of a bolt capable of being released by action exerted against a resilient return force, e.g. from a spring. It then suffices to act on the spring to release the bolt and allow the ball to be inserted into its socket or to be extracted therefrom.

German Patent No. DE 34 11 924 sets forth insulation which is vibration-resistant and mechanically resistant even under unfavorable conditions, which may be for heating gas ducts, such as exhaust gas ducts or turbine support casings, tile elements fastened to the inside of the supporting wall. Each tile element has a box-like covering which is closed on all sides and is made of sufficiently heat-resistant sheet metal with a small thickness, and each tile element consists of a covering wall on the hot side, a storage wall on the cold side and end walls in between.

German Patent No. DE 36 26 514 sets forth a fastener for connecting structural parts in the form of panels, consisting of a pin which is provided with an internal thread and passes through the structural parts, a pot-shaped receptacle which can be clamped to the pin via a threaded bolt which is fitted centrally in the interior of said receptacle, and which receptacle is provided with spring means acting against the entry direction of the pin. Also included are first securing means, which are located in the receptacle and prevent the pin being inadvertently released from the clamped position.

European Patent EP 0 440 544 sets forth a high-temperature thermal protection system consisting of a set of juxtaposed tiles made of a refractory material. The tiles are fixed onto a structure and insulators. This system is designed to be easily dismantlable by virtue of fixing devices, such as screws, which are accessible to tools passing through and deforming a flexible joint placed between two adjacent tiles. The invention applies to the protection of spacecraft or high-speed aircraft, and to the protection of high-temperature vessels or furnaces.

Japanese Patent No. JP 03258699 sets forth receiving fitting for installation on a craft body outer plate through a bottom plate which is constituted with plural tightening fit parts in a crimp shape installed at the circumferential part of a circular plate bottom part, an apertured part formed in the central part.

Japanese Patent No. JP 05203095 sets forth a heat protecting system applied to a body barrel unit and wing upper/lower surfaces of a space vehicle heated to a high temperature within the atmosphere, a high temperature heat insulating material and a high performance heat insulating material are arranged in the outside of a vehicle structural body to cover the outside of these materials with a heat resisting shield. These heat insulating materials and heat resisting shield are fixed to the vehicle structural body by connection fixing tools.

Japanese Patent No. JP 05203096 sets forth a heat protecting system having heat insulating materials arranged on the outside of a vehicle structural body. A heat resisting shield is mounted on the vehicle structural body by a connecting fixture. The connecting fixture is fabricated of a structural body side bolt connected to the vehicle structural body, shield side bolt connected to the heat resisting shield and a bellows for connecting the bolts to each other.

Japanese Patent No. JP 05221398 sets forth a heat protecting material for a space shuttle is fabricated by connecting a surface panel to a main structural panel through a post formed in a shell structure. The supporting post may be formed into a shell structure of hollow cylindrical shape or the like.

Japanese Patent No. JP 07010094 sets forth a heatproof panel mounting member consisting of a metal rod having a male screw part at the outer end part, a ceramic pipe to cover the side portion of the metal rod except for the male screw part, and a pair of metal nuts which are provided with truncated conical portions on their outer circumferential surfaces. The heatproof panel together with a heatproof washer are held between the truncated conical portions of a pair of metal nuts.

Japanese Patent No. JP 09072379 sets forth a vibration insulation fastening mechanism having an insert body fastened to an apparatus; an insert base mounted on a honeycomb sandwich plate through a filler and a spherical body. A viscoelastic material is located between the insert body and the insert base. By converting the deformation due to a vibration mode characteristic of the honeycomb sandwich plate into heat energy accumulated as strain energy in the viscoelastic material, the vibration transmitted from the honeycomb sandwich plate to a host apparatus is reduced.

Japanese Patent No. JP 09126274 sets forth an intermediate support member having a combining plate and a pressing and fixing plate. The fixing plate is pivotably supported on the plate a pivot pin. The combining plate of the intermediate support member is mounted on a support member by an intermediate support member fastening screw.

Japanese Patent No. JP 09263300 sets forth a shaft formed out of a short fiber reinforced ceramic complex material having a conical head portion, a shaft portion and a top protrusion. The entire surface of the shaft is coated with silicon carbide or aluminum oxide to prevent it from binding at elevated temperatures. A high temperature body is inserted into a tapered aperture and an aperture are brought into contact with the head portion. Carbon fiber reinforced complex material bodies and a C collar of niobium alloy coated with aluminum diffusion is bedded between the high temperature structure body and the first protrusion.

Japanese Patent No. JP 10226400 sets forth a strut of light weight space shuttle heat protection material having high heat insulation and a balance of strength, rigidity and deformability. A strut of heat protection material is formed of a flat plate-shaped strut having a substantially narrow strut formed of both structural materials. A space between the surface panel of heat resistant material on the outer side surface and a main structural panel divide both the structural materials into a plurality of components. By connection of various plate-shaped elements and high heat insulating materials, a light weight strut constitution can be obtained, which has high heat insulation suited for a required characteristic of the heat protection material while balancing strength, rigidity and deformability.

Japanese Patent No. JP 2000335500 sets forth a heat insulating structure, capable of withstanding the severe vibrational environment in launching of a spacecraft. A heat insulating structure is formed of a base body, a radiator panel arranged outside the base body and having a long hole therethrough. A spacer is arranged between the base body and the radiator panel and a rod-shaped fastening means is erected on the base body near the spacer.

Japanese Patent No. JP 2004114708 sets forth a heat-resistant structure capable of being easily attached from a front side of a structure. The heat-resistant structure comprises an inclination functioning material body and a pin type fastener integrally molded with an inclination functioning material body. The inclination functioning material body comprises a metal portion integrally formed with a pin type fastener by casting or molding. A composition transition portion is superposed on the metal part and includes a ceramic component superposed on the composition transition.

While the foregoing described prior art devices have endeavored to improve the thermal protective apparatus and art and have in some instances found some use in the art, there remains nonetheless a continuing need in the art for ever more improved thermal protection systems which provide reliability, safety and avoid dependence upon adhesive attachment while simultaneously providing improved efficiency and economy during initial installation and fabrication. Additionally, there remains a continuing need in the art for improved thermal protection systems which also facilitate the repair and replacement of thermally protective tiles and panels during maintenance activities.

SUMMARY OF THE INVENTION

Accordingly, it is a general object to the present invention to provide an improved thermal protection system for use upon air and space vehicles. It is a more particular object of the present invention to provide an improved thermal protection system for use upon air and space vehicles which provides the economy and efficiency of metal fastener or standoff fabrication together with the ease of repair and replacement of protective tiles and panels while safely maintaining a smooth substantially continuous thermal protection surface which is free of surface penetrations and adhesively attached cover plugs.

In accordance with the present invention, there is provided a thermal protection system for use on an air or space vehicle, said thermal protection system comprising: a thermal protection panel having an airfoil surface and a plurality of undersurface reinforcements formed therein; a plurality of fasteners each having a first member secured to one of the reinforcements without penetration of the airfoil surface and a second member secured to an air or space vehicle surface, the first and second members cooperating in an aligned engagement; and a latch mechanism operation within the fasteners to latch the first and second members at a predetermined position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 6 sets forth a section view of an alternate embodiment of the present invention fastener; and FIG. 7 sets forth a perspective view of a typical thermal protection panel constructed in accordance with the present invention for use in combination with the present invention fastener.

DESCRIPTION OF THE PREFERRED EMBODIMENTS OF THE INVENTION

Figures 1, 2:
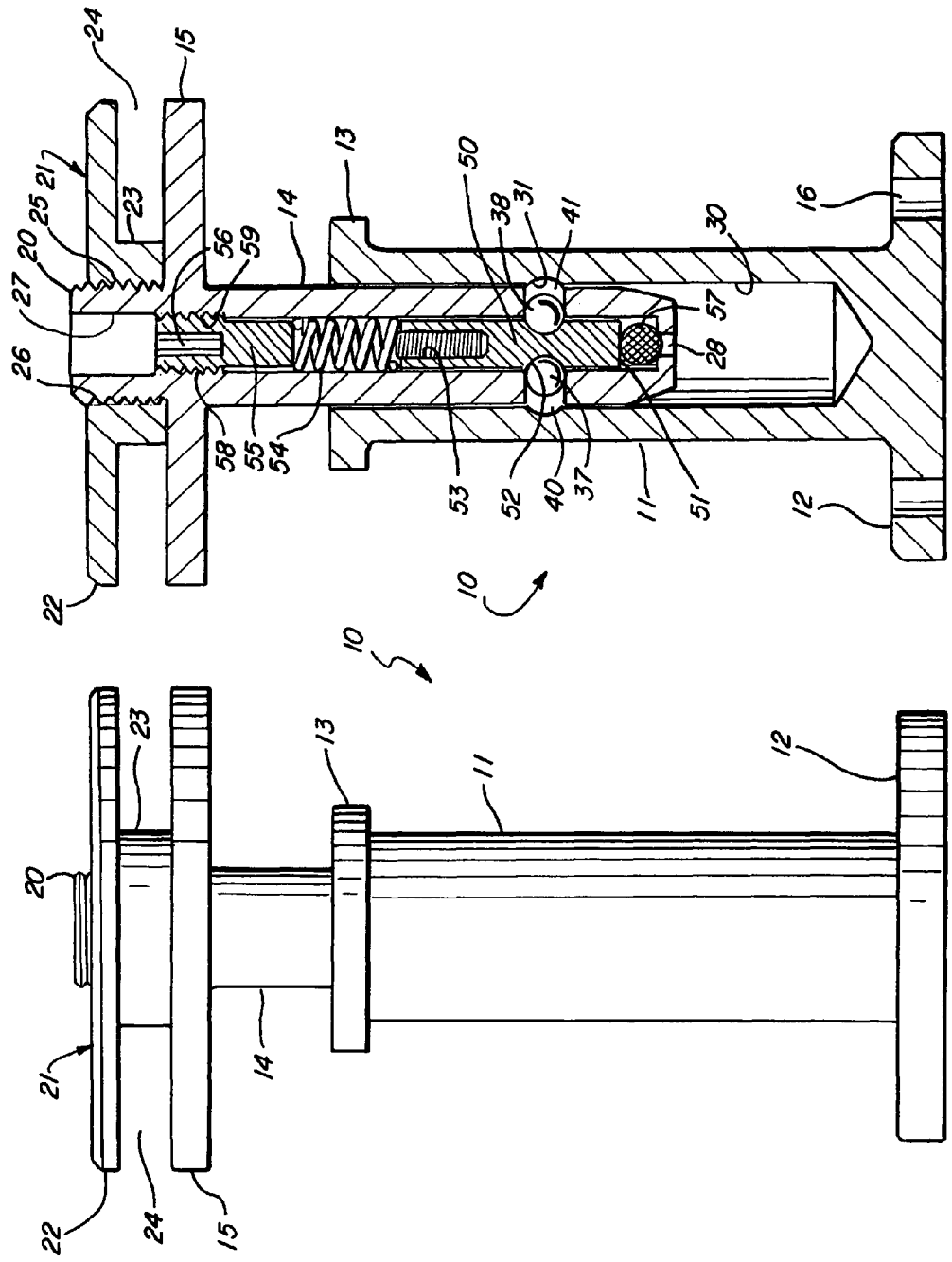
FIG. 1 sets forth a side elevation view of a mechanical fastener for use in a thermal protection system which is constructed in accordance with the present invention.
FIG. 2 sets forth a section view of the fastener shown in FIG. 1.

FIG. 1 sets forth a side elevation view of a fastener constructed in accordance with the present invention and generally referenced by numeral 10. Fastener 10 includes a receptacle 11 having a supporting base 12 and an upper rim 13. Fastener 10 further includes a lock pin carrier 14 which, as is better seen in FIG. 2, is received within receptacle 11. Lock pin carrier 14 includes a generally cylindrical flange 15 and an upwardly extending threaded post 20. In further accordance with the present invention, fastener 10 includes a cap 21 having a threaded collar 23 which is threadably received upon threaded post 20 and secured against flange 15 of lock pin carrier 14. Cap 21 further includes a generally cylindrical flange 22 extending outwardly.

In the assembled configuration shown in FIG. 1, lock pin carrier 14 is partially received within receptacle 11 and is supported therein in the position shown. In further accordance with the present invention, threaded collar 23 of cap 21 spaces flange 22 from flange 15 of lock pin carrier 14 to define a space 24 between flanges 22 and 15. In further accordance with the present invention and as is set forth in FIGS. 5A and 5B below, cap 21 and threaded post 20 cooperate to secure fastener 10 to a thermal protective panel such as panel 80 shown in FIG. 3.

In the preferred fabrication of the present invention, fastener 10 is fabricated of a suitably high strength material such as a high nickel steel alloy or other alloy of the type known in the art as a "super alloy". However, it will be apparent to those skilled in the art that the present invention fasteners may be fabricated of other materials such as composite materials or the like without departing from the spirit and scope of the present invention.

FIG. 2 sets forth a section view of fastener 10. In the configuration shown in FIG. 2, fastener 10 is in its "unlatched" configuration characterized by the ability of lock pin carrier 14 to move within bore 30 of receptacle 11. The operation of the latching mechanism provided by fastener 10 is set forth and described below in FIGS. 5A and 5B in greater detail. Suffice it to note here that in accordance with an important aspect of the present invention, lock pin carrier 14 is movable between an unlatched configuration as shown in FIG. 2 and a fixed latched configuration (seen in FIG. 5B).

More specifically, fastener 10 includes a receptacle 11 defining an interior bore 30, an upper rim 13 and a supporting base 12. Receptacle 11 further defines an annular groove 31 formed within the wall of bore 30. Fastener 10 further includes a lock pin carrier 14 having a lower portion receivable within bore 30 and defining an internal bore 27. Lock pin carrier 14 further defines a plurality of ball passages such as ball passages 40 and 41 extending through the wall of the lock pin carrier. A corresponding plurality of balls such as balls 37 and 38 are captivated within ball passages 40 and 41 respectively. Lock pin carrier 14 further includes an upwardly extending threaded post 20 defining a plurality of external threads 25. Lock pin carrier 14 further defines a generally cylindrical flange 15 and a plurality of internal threads 59 formed within the interior of bore 27.

Fastener 10 further includes a cap 21 having a threaded collar 23 defining a plurality of internal threads 26 and a generally cylindrical flange 22. Cap 21 is assembled to lock pin carrier 14 by the cooperation of external threads 25 on post 20 and internal threads 26 on cap 21. In accordance with an important aspect of the present invention, the threaded attachment of cap 21 upon threaded post 20 and the cooperation of flanges 15 and 22 secure fastener 10 to a thermal protection panel such as panel 80 shown in FIG. 3.

Fastener 10 further includes an elongated lock pin 50 having a lower end 51 positioned near the bottom of bore 27 of lock pin carrier 14. Lock pin 50 further includes a threaded bore 53 and an annular neck 52. Annular neck 52 receives balls 37 and 38 in the unlatched position of fastener 10. Threaded bore 53 is used in removing fastener 10 in accordance with panel removal described below. Fastener 10 further includes a spring 54 positioned upon the upper end of lock pin 50. A threaded plug 55 is received within bore 27 upon spring 54 and defines a plurality of external threads 58. Threads 58 cooperate with internal threads 59 formed within the interior of bore 27 to secure threaded plug 55. Threaded plug 55 further defines a faceted bore 56 which is configured to received an engaging tool such as a hexagonal shaft or the like. In the anticipated fabrication of fastener 10, threaded plug 55 is threaded into bore 27 to slightly compress spring 54.

Fastener 10 further includes a fusible plug 57 which is positioned beneath end 51 of lock pin 50. Plug 57 is captivated at the bottom end of lock pin carrier 14 against aperture 28. In the anticipated fabrication of the embodiment of the present invention shown in FIG. 2, plug 57 is of sufficient firmness to resist the force applied to lock pin 50 by spring 54 and threaded plug 55. Thus, with plug 57 intact, further downward movement of lock pin 50 under the urging of spring 54 is resisted. As a result, fastener 10 remains in the unlatched configuration shown in FIG. 2. This unlatched configuration is characterized by the ability of balls 37 and 38 to move within passages 40 and 41 as well as annular neck 52 thereby leaving lock pin carrier 14 freely movable within bore 30.

In the anticipated use of the present invention, receptacle 11 is secured to the exterior skin and support surface of a host air or space vehicle using a plurality of fasteners passing through apertures 16 formed in base 12. In further accordance with the anticipated use of fastener 10, lock pin carrier 14 is secured to a thermal protection panel such as panel 80 shown in FIG. 3 below. As mentioned, the attachment of lock pin carrier 14 to the thermal protection panel is carried forward by the cooperation of cap 21 upon threaded post 20. Once again, this attachment is described below in greater detail. However, suffice it note here that this attachment allows lock pin carrier 14 to be secured to a thermal protection panel at a position which aligns lock pin carrier 14 with bore 30 of receptacle 11 when the host thermal protection panel is properly positioned upon the host aircraft. In the anticipated fabrication of the present invention thermal protection system, a plurality of fasteners substantially identical to fastener 10 are secured at appropriate positions to a thermal protection panel with each lock pin carrier being precisely positioned upon the underside of the thermal protection panel and each receptacle being precisely positioned upon the air or space vehicle supporting structure such that a panel may then be secured to the host aircraft by aligning the plurality of lock pin carriers and their respective receptacles and thereafter pushing the thermal protection panels into place. Once the thermal protection panel has been properly positioned and pushed into place, the plurality of lock pin carriers will be received within the respective bores of their cooperating receptacles in the configuration shown for lock pin carrier 14 within bore 30 of receptacle 11.

Once the thermal protection panel is properly positioned (see for example FIG. 3), fastener 10 may then be latched to a fixed attachment between lock pin carrier 14 and receptacle 11 by fusing plug 57. Plug 57 is fusible in that it may be reduced to a flowable material state in which plug 57 is no longer sufficiently firm to resist the urging of spring 54 against lock pin 50. In the embodiment shown in FIG. 2, the operation of fusing plug 57 is facilitated by the presence of aperture 28 formed in the lower end of lock pin carrier 14. In essence, as plug 57 is fused, lock pin 50 is then forced downwardly by spring 54 causing the material of plug 57 to flow outwardly through aperture 28 which in turn allows lock pin 50 to move downwardly within bore 27 of lock pin carrier 14. This latching operation is shown and described below in greater detail in FIGS. 5A and 5B. However, suffice it to note here that the downward movement of lock pin 50 and the corresponding movement of annular neck 52 thereof forces balls 37 and 38 outwardly through passages 40 and 41 respectively to thereafter engage annular groove 31 of bore 30 locking the position of lock pin carrier 14 within receptacle 11.

Figure 3:
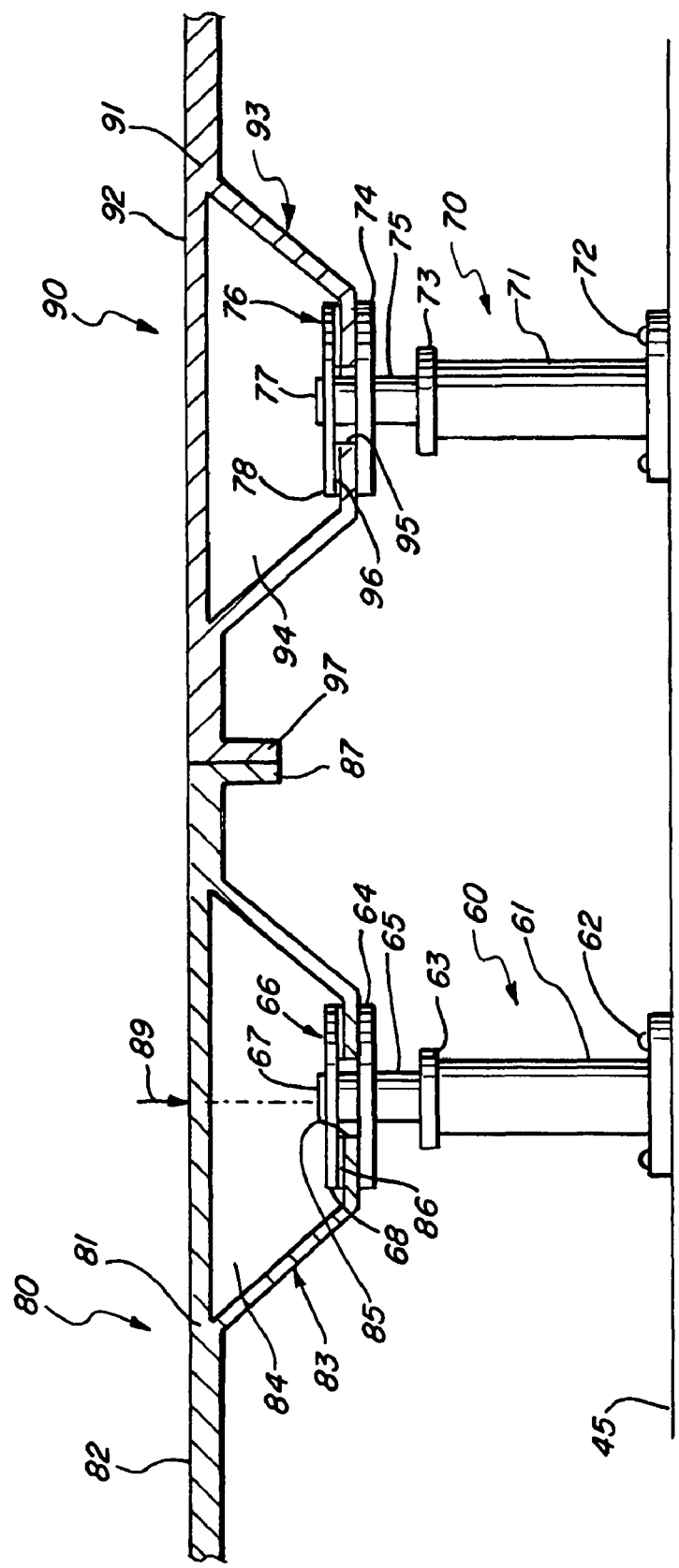
FIG. 3 sets forth a partially sectioned side elevation view of a typical thermal panel installation utilizing fasteners constructed in accordance with the present invention.

FIG. 3 sets forth a partially sectioned side elevation view of a typical installation of a pair of thermal protection panels carried forward in accordance with the present invention thermal protection system. It will be apparent to those skilled in the art that, in accordance with the present invention, each thermal protection panel such as panels 80 and 90 shown in FIG. 3 is secured to a surface of a host aircraft utilizing a plurality of fasteners such as fasteners 60 and 70. However, FIG. 3 facilitates the illustration of several important features of the present invention thermal protection system.

More specifically, a thermal protection panel 80 is constructed in accordance with the present invention and is formed of a suitable ceramic matrix composite material having the desired thermal protection properties. In accordance with an important aspect of the present invention, thermal protection panel 80 defines a continuous outer shield portion 81 having an air foil surface 82 formed thereon. In further accordance with the present invention, thermal protection panel 80 defines a trapezoidal reinforcement portion 83. Trapezoidal reinforcement portion 83 is integrally formed with outer shield portion 81 of thermal protection panel 80 and forms an internal channel 84 beneath outer shield portion 81. The structure of trapezoidal reinforcement portion 83 is shown in FIG. 7 in greater detail. It will be noted that reinforcement portion 83 defines a plurality of apertures 85 and 88. Returning to FIG. 3, the section view of FIG. 3 is taken through the portion of trapezoidal reinforcement member 83 which includes aperture 85.

In further accordance with an important aspect of the present invention, a fastener generally referenced by numeral 60 and fabricated in accordance with the structure set forth above includes a receptacle 61 having a base portion secured to a host aircraft surface 45 by a plurality of fasteners 62. Fastener 62 may be conventional fasteners of the type commonly used in aircraft fabrication and thus may, for example, include threaded fastener apparatus. Receptacle 61 further includes an upper rim 63. Fastener 60 further includes a lock pin carrier 65 which is partially received within receptacle 61. Lock pin carrier 65 includes a generally cylindrical flange 64 and an upwardly extending threaded post 67. In accordance with the preferred fabrication of the present invention thermal protection system, post 67 of lock pin carrier 65 is extended upwardly through aperture 85 formed in trapezoidal reinforcement 83. In further accordance with the present invention, a flexible grafoil pad is positioned upon the interior surface of trapezoidal reinforcement 83 encircling post 67. Thereafter, a cap 66 is threadably secured to post 67 extending downwardly through aperture 85 of trapezoidal reinforcement 83. Cap 66 threadably engages post 67 and is secured with sufficient force to captivate pad 86 and the underlying portion of trapezoidal reinforcement 83 between flange 64 of lock pin carrier 65 and flange 68 of cap 66. In this attachment, flexible grafoil pad 86 provides a vibration resisting attachment and an isolation between flange 68 and the underlying portion of trapezoidal reinforcement 83. Thus use of compressible graphite material for pad 86 provides high temperature strain isolation protecting the ceramic matrix composite panel material while ensuring uniform pressure loading at the points of fastener attachment. In this manner, localized loads or stresses exceeding the characteristics of the ceramic matrix composite material are avoided. In addition, the use of compressible graphite material pads provides a buffer to dampen the effects of high levels of vibration encountered in flight.

The installation of thermal protection panel 80 is carried forward by securing a plurality of lock pin carriers such as lock pin carrier 65 to corresponding positions upon the trapezoidal reinforcements of panel 80 such as trapezoidal reinforcement 83. Additionally, a corresponding plurality of receptacles such as receptacle 61 are precisely positioned upon surface 45 of the host aircraft. Thereafter, assembly of thermal protection panel 80 to the host aircraft is carried forward by positioning panel 80 such that the lock pin carriers of the fasteners are aligned with their respective receptacles in the manner shown for lock pin carrier 65 in alignment with receptacle 61 of fastener 60. Thereafter, panel 80 is positioned and the fusible plugs within the fasteners are fused to facilitate the latching of the fasteners. In the example shown in FIG. 3, the fusible plug within fastener 60 (not shown) is fused to provide the above-described latching action between lock pin carrier 65 and receptacle 61. Once fastener 60 has been latched, the position of thermal protection panel 80 with respect to surface 45 of the host air or space vehicle is maintained. In a similar fashion, a second thermal protection panel 90 substantially identical to panel 80 is secured upon surface 45 of the host air or space vehicle utilizing a second plurality of fasteners constructed in accordance with the present invention. By way of example, FIG. 3 shows a partial section view of thermal protection panel 90 secured by a fastener 70. Fastener 70 is fabricated in the manner described above and includes a receptacle 71 having a base secured to surface 45 by a plurality of fasteners 72 and defining an upper rim 73. Fastener 70 further includes a lock pin carrier 75 partially received within receptacle 71. Lock pin carrier 75 further includes an upwardly extending threaded post 77 and a generally circular cylindrical flange 74. Fastener 70 further includes a cap 76 having a flange 78.

Thermal protection panel 90 includes an outer shield 91 having an external airfoil surface 92 formed thereon. Panel 90 further includes a trapezoidal reinforcement 93 defining an aperture 95. A channel 94 is formed within trapezoidal reinforcement 93. In accordance with the present invention, fastener 70 is secured to trapezoidal reinforcement 93 by passing threaded post 77 upwardly through aperture 95 and thereafter positioning cap 76 upon post 77 and threading cap 76 downwardly to captivate trapezoidal reinforcement 93 between flanges 74 and 78. In a similar fashion to the attachment of thermal protection panel 80, thermal protection panel 90 utilizes a flexible grafoil pad 96 positioned between flange 78 and reinforcement 93. Cap 76 is threaded upon post 77 with sufficient force to securely captivate trapezoidal reinforcement 93.

It will be noted that thermal protection pads 80 and 90 define respective return edges 87 and 97. It will be further noted that in the preferred fabrication of the present invention thermal protection system, panels 80 and 90 are positioned such that return edges 87 and 97 precisely abut each other to form a virtually seamless attachment and thereby provide a substantially continuous airfoil surface comprised of airfoil surfaces 82 and 92. In this fashion, the present invention system is able to provide a virtually seamless penetration free outer thermal protection panel array for the host aircraft. It will be further noted by examination of FIG. 3 that fasteners 60 and 70 are hidden from the exterior surface of their respective thermal protection panels. In this manner, the possibility of a thermal short is virtually eliminated since the covering of fasteners 60 and 70 does not rely upon adhesive plugs or caps as is the case with the above-mentioned prior art structures. The use of thermal protection panel fabrications which completely cover and completely hide the underlying fasteners which support them provides a maximum of thermal protection and safe protection against the possibility of failure which can create a thermal short and its resulting consequences.

Figure 4:
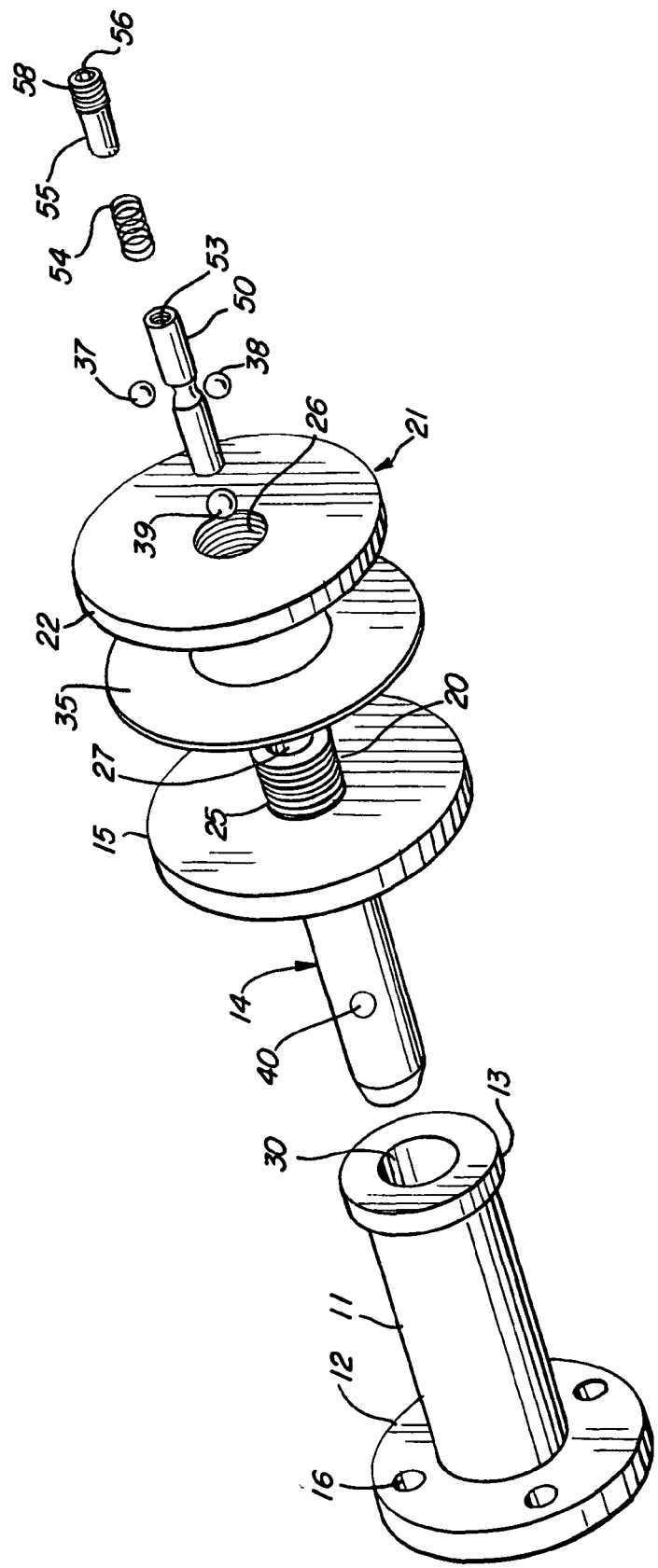
FIG. 4 sets forth a perspective assembly view of a fastener constructed in accordance with the present invention.

FIG. 4 sets forth a perspective assembly view of a fastener constructed in accordance with the present invention and generally referenced by numeral 10. As described above, fastener 10 includes a receptacle 11 having a base 12 which defines a plurality of apertures 16. As is also described above, receptacle 11 defines an upper rim 13 and an internal bore 30. Fastener 10 further includes a lock pin carrier 14 having a plurality of passages such as passage 40 formed therein. Lock pin carrier 14 further includes an outwardly extending flange 15 and a threaded post 20. Post 20 defines a plurality of external threads 25 and an internal bore 27. Fastener 10 further includes a cap 21 having a generally cylindrical flange 22 and defining a threaded bore 26. A grafoil pad 35 is positioned between flanges 15 and 22. A lock pin 50 defines an annular neck 52 and a threaded bore 53. A plurality of balls such as balls 37, 38 and 39 are received within annular neck 52. Fastener 10 further includes a spring 54 and a threaded plug 55. Threaded plug 55 defines a plurality of external threads 58 and a faceted bore 56.

Figure 5A:
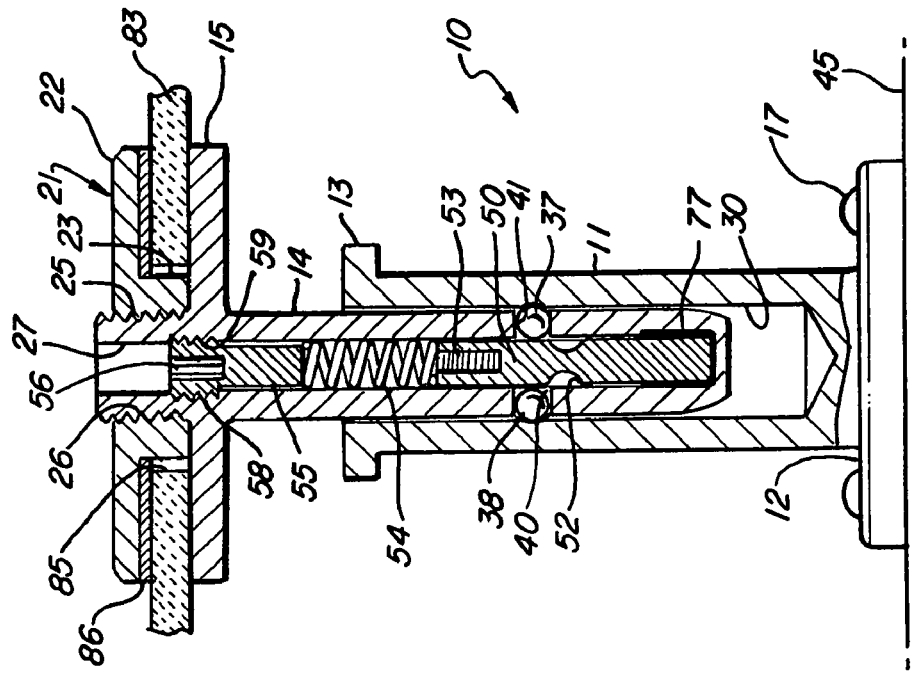
FIGS. 5A and 5B set forth section views of the present invention fastener in the unlatched and latched position.
Figure 5B:
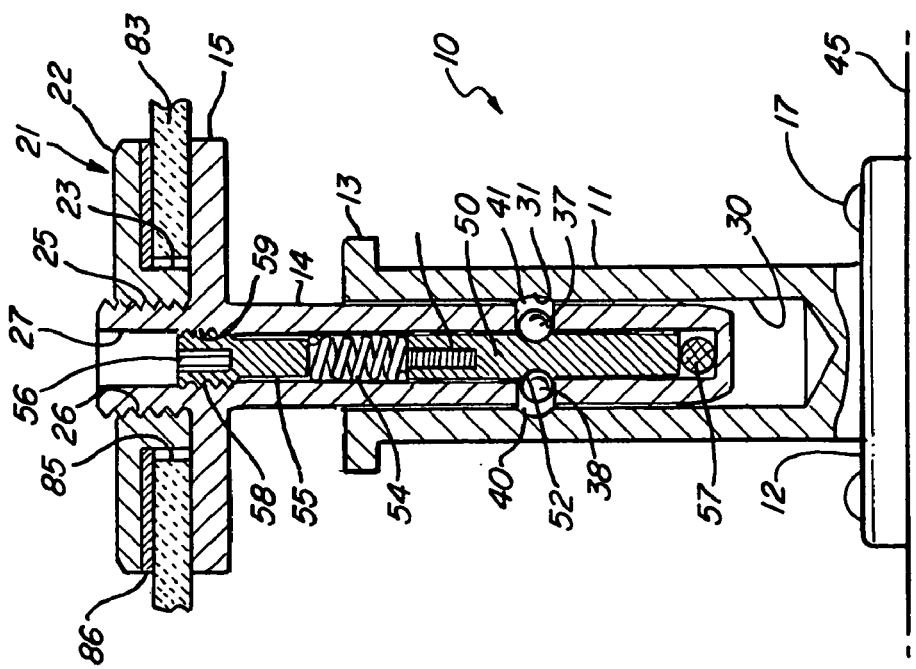

FIGS. 5A and 5B show section views of fastener 10 in the unlatched and latched configurations thereof respectively. Thus, FIG. 5A shows fastener 10 in the unlatched configuration while FIG. 5B show fastener 10 in its latched configuration. It will be apparent to those skilled in the art by comparing FIGS. 5A and 5B that they differ solely in the condition of fusible plug 57 and the position resulting therefrom for lock pin 50.

More specifically, fastener 10 includes a receptacle 11 defining an interior bore 30, an upper rim 13 and a supporting base 12. Receptacle 11 further defines an annular groove 31 formed within the wall of bore 30. Fastener 10 further includes a lock pin carrier 14 having a lower portion receivable within bore 30 and defining an internal bore 27. Lock pin carrier 14 further defines a plurality of ball passages such as ball passages 40 and 41 extending through the wall of the lock pin carrier. A corresponding plurality of balls such as balls 37 and 38 are captivated within ball passages 40 and 41 respectively. Lock pin carrier 14 further includes an upwardly extending threaded post 20 defining a plurality of external threads 25. Lock pin carrier 14 further defines a generally cylindrical flange 15 and a plurality of internal threads 59 formed within the interior of bore 27.

Fastener 10 further includes a cap 21 having a threaded collar 23 defining a plurality of internal threads 26 and a generally cylindrical flange 22. Cap 21 is assembled to lock pin carrier 14 by the cooperation of external threads 25 on post 20 and internal threads 26 on cap 21. In accordance with an important aspect of the present invention, the threaded attachment of cap 21 upon threaded post 20 and the cooperation of flanges 15 and 22 secure fastener 10 to a thermal protection panel such as panel 80 shown in FIG. 3.

Fastener 10 further includes an elongated lock pin 50 having a lower end 51 positioned near the bottom of bore 27 of lock pin carrier 14. Lock pin 50 further includes a threaded bore 53 and an annular neck 52. Annular neck 52 receives balls 37 and 38 in the unlatched position of fastener 10. Threaded bore 53 is used in removing fastener 10 in accordance with panel removal described below. Fastener 10 further includes a spring 54 positioned upon the upper end of lock pin 50. A threaded plug 55 is received within bore 27 upon spring 54 and defines a plurality of external threads 58. Threads 58 cooperate with internal threads 59 formed within the interior of bore 27 to secure threaded plug 55. Threaded plug 55 further defines a faceted bore 56 which is configured to received an engaging tool such as a hexagonal shaft or the like. In the anticipated fabrication of fastener 10, threaded plug 55 is threaded into bore 27 to slightly compress spring 54.

With respect to FIG. 5A, it will be noted that in the unlatched configuration of fastener 10, fusible plug 57 is intact and has not yet been utilized in allowing fastener to move to its latched configuration. It will be apparent to those skilled in the art that a variety of different materials and fusing methods may be utilized to provide the latching action of the present invention fastener. Thus, for example, fusible plug 57 may be formed of a cold-flow (creep) polymeric retaining compound in which the "fusing" of plug 57 may be achieved at room temperatures utilizing the cold flow characteristics of the plug material. In this manner, the polymer material of plug 57 is able to cold flow at relatively low temperatures and facilitate the latching action of fastener 10. Alternatively, plug 57 may be formed of a fusible indium alloy material which is able to melt and flow in response to heating thereof. In further addition, plug 57 may be formed of a loctite high temperature retaining compound which flows when subjected to a sufficiently elevated temperature.

While a variety of different materials may be utilized for fusible plug 57, the essential function is the provision of a plug which will flow and allow lock pin 50 to move from the unlatched configuration shown in FIG. 5A to the latched configuration shown in FIG. 5B. Comparison of FIGS. 5A and 5B shows that, upon fusing of plug 57, lock pin 50 is urged downwardly by spring 54 to force balls 37 and 38 downwardly via passages 40 and 41 and thereby engage annular groove 31. The engagement of balls 37 and 38 within annular groove 31 locks the position of lock pin carrier 14 within bore 30 of receptacle 11 and maintains fastener 10 in its latched configuration.

In accordance with a further important aspect of the present invention, the thermal protection panels of the present invention thermal protection system may be removed for service and repair in a relatively simple and straightforward procedure.

In accordance with a further advantage of the present invention thermal protection system, one or more thermal protection panels may be removed for replacement or other purposes without disturbing surrounding panels and without extensive equipment or facilities. The removal of a thermal protection panel in the present invention system may best be understood by simultaneous reference to FIGS. 3 and 5B. It will be recalled that FIG. 5B shows the fastener of the present invention thermal protection system in its latched configuration. It will be further recalled that the configuration of fastener 10 shown in FIG. 5B corresponds to the use of a fusible plug 57 (seen in FIG. 5A) which has been caused to flow and facilitate the latching of fastener 10. In accordance with one embodiment of the present invention, the configuration shown in FIG. 5B shows the residual or remnants of plug 57 having flowed to form a sealing locking attachment 77 between the bottom of lock pin carrier 14 and lock pin 50 generally referenced by numeral 77. It will be understood that material 77 is, in fact, the material of plug 57 following the flowing action described above. Thus, in discussing the removal of thermal protection panel 80 (seen in FIG. 3), it will be assumed that fastener 60 is latched in the configuration shown in FIG. 5B. Thus, removal of thermal protection panel 80 is initiated by drilling a hole in the outer surface of thermal protection panel 80 as indicated by arrow 89. The proper location for drilling a hole for removal may be marked in a suitable manner or, alternative, may be located utilizing a template or other type of diagram. A conventional drill suitable for penetrating the material of thermal protection panel 80 is then utilized to drill a hole as indicated by arrow 89. Thereafter, a tool having a faceted head which is configured in correspondence to faceted bore 56 of threaded plug 55 is then passed through the hole drilled in thermal protection panel 80 and extended downwardly into faceted bore 56 of threaded plug 55. Once the faceted tool such as conventional hexagonal allenhead wrench or the like engages the faceted bore of threaded plug 55, the user simply rotates the tool threading plug 55 outwardly from threads 59 and allowing spring 54 to move plug 55 upwardly. The user then simply withdraws plug 55 and spring 54 upwardly through the hole formed in thermal protection panel 80 using suitable grasping tools. With spring 54 and plug 55 removed, the user then passes a threaded tool downwardly through the aperture formed in thermal protection panel 80 into threaded bore 53 of lock pin 50. Once the threaded tool is engaged, the user simply draws lock pin 50 upwardly until balls 37 and 38 are aligned with annular neck 52 at which point fastener 60 has resumed the unlatched configuration shown in FIG. 5A. Accordingly, lock pin carrier 14 is now freely movable and may be withdrawn from receptacle 11. A similar operation is performed on each of the fastener structures which support thermal protection panel 80. Once the unlatching of the fasteners is complete, thermal protection panel 80 together with the lock pin carriers such as lock pin 14 is withdrawn from the assembly. The withdrawn panel may be replaced by a new panel having appropriate lock pin carriers secured thereto in the above-described assembly manner and once again locked in place using the latched configuration of the fasteners such as fastener 60. In this manner, the removal and replacement of one or more thermal protection panels may be carried forward without disturbing the adjacent panels and without extensive procedures.

FIG. 6 sets forth a section view of a still further alternate embodiment of the present invention thermal protection system which utilizes a fastener structure substantially identical to the above-described fasteners in mechanism and operation but reversed in orientation from the previously shown structures. Essentially, the fastener shown in FIG. 6 and generally referenced by numeral 100 utilizes the components of the above-described fasteners in a reverse configuration. Thus, the embodiment in FIG. 6 utilizes a receptacle secured to the thermal protection panel cooperating with a lock pin carrier which is secured to the underlying skin or structure of the host air or space vehicle.

More specifically, fastener 100 includes a lock pin carrier 103 having a base 101 secured to surface 45 by a plurality of conventional fasteners 102. Lock pin carrier 103 defines an internal bore 107 within which a plug 104 and spring 105 are supported. A lock pin 106 defines an annular neck 108.

Fastener 100 further includes a receptacle 124 defining an interior bore 125. Receptacle 124 further defines a bore 123 and an upwardly extending threaded post 116. Receptacle 124 further defines a flange 115. A cap 120 substantially identical to cap 21 shown in FIGS. 5A and 5B is threaded upon post 116. Cap 120 defines a flange 121. Cap 120 is threaded upon post 116 with sufficient force to captivate trapezoidal reinforcement 83 and pad 86 in substantially the same attachment set forth above in FIGS. 5A and 5B. Receptacle 124 further defines an annular groove 111 while lock pin carrier 103 defines a plurality of ball passages such as passage 110. Balls 112 and 113 are captivated between lock pin 106 and bore 125 of receptacle 124.

The operation to provide latched and unlatched configurations for fastener 100 is carried forward in substantially the same manner as described above. In accordance therewith, a fusible plug 114 is positioned within lock pin carrier 103 and against the upper surface of lock pin 106. In similar fashion to the above-described embodiments, fusible plug 114 is sufficient in firmness to resist the force of spring 105 until the plug has been fused. Thus, in FIG. 6, fastener 100 is in its unlatched configuration due to the presence of plug 114. Fastener 100 is reconfigured to its latched configuration by fusing plug 114 using either cold flow or suitable energy radiation in the above-described operation to essentially melt or soften plug 114 to provide flowing of the plug material and allow lock pin 126 to move upwardly under the urging of spring 105. The movement of lock pin 106 forces balls 112 and 113 outwardly into annular groove 111 again latching the configuration of fastener 100 and securing the thermal protection panel.

FIG. 7 sets forth a bottom perspective view of a thermal protection panel constructed in accordance with the present invention and generally referenced by numeral 80. Panel 80 includes an outer shield portion 81 having a pair of return edges 87 and 76 on either end thereof. Panel 80 further includes a pair of integrally formed trapezoidal reinforcements 83 and 73 defining respective channels 84 and 74 therein. Trapezoidal reinforcement 83 defines a pair of apertures 85 and 88 while trapezoidal reinforcement 73 defines a corresponding pair of apertures 75 and 78. It will be apparent to those skilled in the art that panel 80 may be shaped and configured as required for covering the surfaces of a complex shape of an air or space vehicle without departing from the spirit and scope of the present invention.

What has been shown is a novel thermal protection system for use in air and space vehicles having a plurality of thermal protection panels formed of a suitable ceramic matrix composite or other material which provides a continuous outer surface free of penetrations and which utilizes a plurality of hidden fasteners cooperating with trapezoidal reinforcement members formed in the panel to secure the panels to a surface of an air or space vehicle. The fasteners utilize a latching mechanism for facilitating the simple attachment of the panels. The resulting thermal protection panels form a substantially continuous surface free of penetrations and adhesive material.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A thermal protection system for use on air or space vehicle, said thermal protection system comprising:
a thermal protection having an airfoil surface and a plurality of undersurface reinforcements formed therein;
a plurality of fasteners each having a first number secured to one of said reinforcements without penetration of said airfoil surface and a second member secured to an air or space vehicle surface, said first and second members cooperating in an aligned engagement;
a latch mechanism operative within said fasteners to latch said first and second members at a predetermined position; and
a fusible element restraining said first and second members from said predetermined position until fused, said fusible element being fused to fix attachment of said panel.

2. The thermal protection system set forth in claim 1 wherein said airfoil surface is free of penetrations.

3. The thermal protection system set forth in claim 2 wherein said thermal protection panel includes an outer shield supporting said airfoil surface and wherein each of said reinforcements includes a wall portion extending from and integrally formed with said outer shield to define a channel therebetween.

4. The thermal protection system said forth in claim 3 wherein said first member includes an elongated lock pin carrier secured to said reinforcement and wherein said second member includes a receptacle secured to a surface of a host air or space vehicle and defining a bore receiving a portion of said lock pin carrier.

5. The thermal protection system set forth in claim 4 wherein said latch mechanism includes a lock pin supported within said lock pin carrier and movable between a latched and unlatched position, a spring urging said lock pin toward said latched position and a fusible plug restraining said lock pin in said unlatched position against the force of said spring.

6. The thermal protection system set forth in claim 5 wherein said latch mechanism includes an annular groove formed in said receptacle bore, a plurality of ball passages formed in said lock pin carrier, a plurality of balls within said ball passages and an annular neck formed in said lock pin.

7. The thermal protection system set forth in claim 6 wherein said reinforcements include a reinforcement aperture therein and wherein said lock pin carrier includes a threaded post extending through said reinforcement aperture and a threaded cap engaged therewith to secure said lock pin carrier to said reinforcement.

8. The thermal protection system said forth in claim 3 wherein said second member includes an elongated lock pin carrier secured to said air or space vehicle surface and wherein said first member includes a receptacle secured to said reinforcement and defining a bore receiving a portion of said lock pin carrier.

9. The thermal protection system set forth in claim 8 wherein said latch mechanism includes a lock pin supported within said lock pin carrier and movable between a latched and unlatched position, a spring urging said lock pin toward said latched position and wherein said fusible element includes a fusible plug restraining said lock pin in said unlatched position against the force of said spring.

10. The thermal protection system set forth in claim 9 wherein said latch mechanism includes an annular groove formed in said receptacle bore, a plurality of ball passages formed in said lock pin carrier, a plurality of balls within said ball passages and an annular neck formed in said lock pin.

11. The thermal protection system set forth in claim 10 wherein said reinforcements include a reinforcement aperture therein and wherein said lock pin carrier includes a threaded post extending through said reinforcement aperture and a threaded cap engaged therewith to secure said lock pin carrier to said reinforcement.

12. For use in an air or space vehicle having a vehicle surface requiring protection from excessive heat, a thermal protection system comprising:

a plurality of thermal protection panels formed of a heat-resistant material and each including an outer shield supporting a penetration-free airfoil surface and an underside having a plurality of reinforcement members formed thereon;

a plurality of fasteners each of said fasteners including first and second telescopingly joinable fastener members, said first member being secured to one of said reinforcements and said second member being secured to said vehicle surface;

a spring-driven latch operative to restrain said first and second fastener members in a latched configuration of attachment; and a fusible link restraining said first and second members from said latched configuration until said fusible link is fused, said fusible link being fused to fix attachment of said panel.

13. For use in an air or space vehicle having a vehicle surface requiring protection from excessive heat, a thermal protection system comprising:

a plurality of thermal protection panels each having a penetration-free airfoil surface;

a plurality of fasteners securing said thermal protection panels to said vehicle surface, each of said fasteners defining a latched immovable configuration and an unlatched movable configuration;

a fusible member within each of said fasteners operative to prevent fastener configuration to said latched immovable configuration until said fusible member is fused to complete panel attachment.

14. The thermal protection system set forth in claim 13 wherein said fusible member is formed of an indium alloy.

15. The thermal protection system set forth in claim 13 wherein said fusible member is formed of a cold-flow polymeric retaining compound.

16. The thermal protection system set forth in claim 13 wherein said fusible member is formed of a high temperature retaining compound.

* * * * *